UNITED STATES PATENT OFFICE 2,501,336

REFRACTORY SHAPE AND METHOD OF MAKING

Collin Hyde, Bethel Township, Berks County, and Francis P. Shonkwiler, Crafton, Pa., assignors to Harbison-Walker Refractories Company, Pittsburgh, Pa., a corporation of Pennsylvania No Drawing. Application May 8, 1948,
Serial No. 26,003

8 Claims. (Cl. 106—58)

This invention relates to refractory brick and other shapes made from non-plastic refractory materials.

The materials used for making refractory brick and other shapes may be considered in two broad classes, viz., plastic and non-plastic materials. The plastic refractory materials are self-bonding when tempered with water or similar liquid so that they lend themselves to ceramic manufacturing processes with little or no trouble. Thus, brick may be made from fire clay by the use of dry press or auger machines, and the natural plasticity of the clay imparts sufficient strength to the freshly made brick to permit safe handling.

Such non-plastic refractory materials as dead burned magnesite, chrome ore, and forsteritic materials, e. g., olivine rock, have, in contrast, no appreciable plasticity so that brick made from them are virtually without initial strength at the time of forming. Various temporary binders, both organic and inorganic in nature, have consequently been used in the manufacture of brick of this type from these non-plastic materials, a common example being a concentrate from waste lignin liquor. In the case of basic refractories containing magnesia some producers have added sulfuric acid or magnesium sulfate to the batch to cause development of an oxysulfate bond. However, with such binders as have been used with non-plastic refractories the full strength of the bond is not developed until after the brick have been dried, or until after they have stood for an extended period of time. This lack of green strength means, of course, that the freshly formed brick are exceedingly friable, or fragile, and that they must be handled with extreme care. Moreover, for the same reason it has been necessary to dry the brick before they are set to be burned, and to that end it has been necessary either to handle the bricks manually with extreme care or to use mechanical pickers to place them one-high on pallets that go to the drier. Despite the most careful handling breakage losses have been high, and the inability to stack the freshly formed brick to multiple heights coupled with the necessity for drying them and rehandling them before being set for burning has been economically disadvantageous. In other words, bricks of this type have had to be placed one high on pallets, dried, moved to kiln cars, and then burned.

A primary object of this invention is to provide a method of making from non-plastic refractory materials, singly or in combination, refractory brick and other shapes that possess sufficiently high green strength when freshly formed to permit their being handled manually and to be piled to multiple heights for drying and firing, which eliminates the need for rehandling between the drying and firing steps, and which is simple, inexpensive, does not interfere with or require essential change in existing methods for the production of such shapes, and minimizes, consequently, the aforementioned losses due to damage in handling, drying and firing.

Other objects will appear from the following specification.

We have discovered, and it is upon this that the present invention is in large part predicated that the objects of the invention are attained by the use of tall oil as a temporary bond in batches of refractory materials. An outstanding feature of the invention is that refractory brick and other refractory shapes made in this way come from the press with sufficient strength to permit them to be handled manually and to be stacked at once to multiple heights on kiln cars for drying and burning, without the necessity for rehandling between drying and burning. Thus, we have found that by the practice of the invention as applied to the production of basic brick we can stack standard 9-inch straights nine high on edge, i. e., to a height as great as 40 inches, on kiln cars going to the drier and then directly to the burning kiln. In contrast, under prior practices, to repeat, the brick had to be taken from the press with extreme care, placed one-high on drier pallets, dried, then transferred to kiln cars, and then burned, and even with the best of care the scuffing and vibration caused, on an average, about 15 per cent loss of brick, due to lack of green strength. By the use of tall oil, in contrast, we eliminate the rehandling and thus reduce labor cost. Also, the loss of unshippable brick is, on the average, but about 5 per cent, and breakage in drying, which has accounted for about half the entire loss, is eliminated thus increasing production.

Among the non-plastic refractories to which the invention is applicable especially good results are to be had with those consisting of or containing high proportions of magnesia, either as such or as silicate, e. g. dead burned magnesite and such forsteritic materials as olivine. In other words, it is applicable to batches containing magnesian refractories. Outstandingly good results are to be had with chrome ore also, and to mixtures of it with magnesian refractories. Calcined alumina also responds although the green strength (resistance to jarring and scuffing) may not be quite so great as in the case of the foregoing materials. On the other hand, no improvement is had by the use of tall oil with such refractories as cyanite, raw or calcined flint clay, calcined bauxite, silicon carbide, zircon and silica, and in the case of some of these materials the fragility was greater with tall oil than with water.

The amount of tall oil to be incorporated in the refractory batch to obtain the benefits of this invention will depend in part upon the batch itself, i. e., upon the particular refractory used, whether the batch is composed of a single non-plastic refractory material or a mixture of such materials, and also upon the grain sizing of the batch. We find that in the case of the refractory materials to which the invention is applicable there should be at least about 1 per cent of tall oil based upon the dry weight of the batch. As the amount of tall oil is increased, within limits, the green strength of the bricks as pressed increases but likewise the batch tends to become stickier, and eventually gummy, which may interfere with the proper working of the equipment such as conveyors, chargers, presses, and other equipment associated with the forming operation. For most purposes we find that from about 1 to about 5 per cent of tall oil, based upon the dry weight of the batch, suffices to achieve the full benefits of the invention.

The amount of tall oil to be incorporated in the batch may be lessened somewhat by the addition of water. In any case the batch must be tempered to proper pressing consistency, and a balance between green strength developed by the tall oil and the cost of the temporary bond may be determined for each type of refactory used.

Additional strength at the press may be realized by the use of a combination of tall oil and lignin liquor. The lignin liquor, while not essential, serves like water as a suitable liquid to bring the batch to the proper pressing consistency, and, also like water, permits reduction of the amount of tall oil needed. Optimum results are to be had, in general, by the use of about equal amounts of tall oil and lignin liquor or water.

Experience has shown that brick made from such non-plastic materials according to standard commercial practice are so fragile when pressed that their modulus of rupture can not be measured because they break up when it is attempted to place them in the testing device. In contrast, brick made under identical conditions but with tall oil and lignin liquor in accordance with this invention show a modulus of rupture of 45 p. s. i. as they come from the press.

As illustrating this, a typical mix for making forsterite brick prior to our invention would be 80 per cent of olivine passing 4 mesh, and 20 per cent of dead burned refractory magnesite, or magnesia, passing 65 mesh. According to standard works practice those materials are mixed dry and then tempered for dry pressing by the addition of, on a dry weight basis, 2 per cent each of lignin liquor and water. The lignin liquor provides strength upon drying but the brick thus made are not strong enough when pressed to permit the press operator to handle them with one hand, and it is only by the most extreme care that they may be moved at all using two hands, and even though in production practice they may be moved by mechanical pickers, they are placed one-high on a pallet, and the pallets are in turn stacked on a pallet car and sent through a drier. Thereafter they must be transferred to kiln cars for burning. So friable are such brick that irregularities in the pallet or even a small piece of dirt under the brick may cause breakage.

When, however, 3 percent of tall oil is substituted for the lignin liquor and water in the foregoing practice, with other conditions, such as mixing and pressing, the same, the brick come from the press with unexpected strength. The brick are strong enough to be handled safely with one hand, or to be pushed away by automatic chargers for setting directly on cars going to the burning kiln. Thus mechanical pickers are rendered unnecessary as well as the rehandling after drying that has heretofore been requisite. Brick made with 2 to 2.5 per cent of tall oil and an equal amount of lignin liquor possess substantially the same strength, wherefore the amount of tall oil may be reduced somewhat by such use of lignin liquor.

The reason why tall oil thus acts to confer green strength without drying or storage is not apparent. In the course of the work leading up to this invention we have tried a considerable number of temporary bonding agents of widely diverse character, particularly with brick mixes comprising olivine, magnesia, and chrome ore, and various combinations of them. Thus we tried magnesium sulfate, caustic magnesia, magnesium chloride, magnesium hydroxide, kerosene, fuel oil, lubricating oils, grease, polyethylene glycols, various forms of starch, carboxymethylcellulose, oleic acid, lactic acid, quebracho extract, amine type flotation agents, and drying oils, e. g. linseed oil. None of those agents developed sufficient green strength in the brick to justify their use in these non-plastic refractory mixes.

The raw materials for brick mixes utilizing our invention may be prepared by any of the methods standard in the refractory trade. For example either a gap grind or a continuous grind may be used. In either case it is preferred that sufficient fines, for example minus 65 mesh, be used so that high density may be obtained. The use of an ample percentage of fines also improves the appearance of the brick by giving it a smoother surface. With some refractory materials insufficient amounts of fine material are formed during the usual grinding operations in dry pans, rolls, etc. This may require that a portion of the material be given additional grinding, as in a ball mill.

The tall oil, with or without water or other aqueous liquid such as lignin liquor, may be mixed with the refractory grains in any of the standard mixers but we prefer to use a batch mixer of the pan type. When a combination of tall oil and lignin liquor is used it is desirable to add the tall oil first and mix for a sufficient time to wet the refractory grains before the lignin liquor is added, but this procedure is not essential or critical. For reasons of economy the amount of tall oil used should be such that the total cost of temporary binder is at a minimum while still giving the required strength. Water or lignin liquor, when used, is added to bring the mix to pressing consistency. In the manufacture of bricks we prefer to use a forming pressure of from 5 to 15 thousand p. s. i. although with carefully grain sized materials it is possible to press at lower pressures and still develop sufficient strength to attain the benefits of this invention.

The tall oil used in the practice of this invention is a by-product of the sulfate process of making pulp from pine wood. It is available in various grades such as whole and distilled tall oil;

all have given satisfactory results in the practice of the invention and are contemplated by the term "tall oil" as used herein and in the appended claims. Whole tall oil is composed largely of a complex mixture of higher fatty acids and the so-called rosin acids in approximately equal proportions, together with a minor proportion of non-acids generally considered to be composed of largely sterols. Distilled tall oil contains a higher proportion of fatty acids, a lower proportion of rosin acids, and its acid and saponification numbers are higher.

Although the invention is primarily advantageous, for reasons pointed out above, it is to be observed that if the brick are simply dried the tall oil develops a water-resistant temporary bond, which is of advantage for various purposes. For example, this characteristic may be applied in connection with chemically bonded unfired brick.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. That method of making refractory shapes which comprises providing a batch of at least one non-plastic refractory material of the group consisting of magnesian refractory, chrome ore and calcined alumina, adding from about 1 to about 5 per cent of tall oil to the batch, then forming shapes from the batch, and drying and firing the shapes.

2. That method of making refractory shapes according to claim 1 which comprises adding to the batch, based upon its dry weight, from about 1 to about 5 per cent each of tall oil and of lignin liquor, then forming shapes from the batch, and drying and firing the shapes.

3. A method according to claim 1, said refractory material being dead burned magnesite.

4. A method according to claim 1, said refractory material being olivine.

5. A pressed and unfired shape of at least one non-plastic refractory material of the group consisting of magnesian refractory, chrome ore, and calcined alumina and containing from about 1 to about 5 per cent of tall oil as temporary binder and characterized by possessing green strength as pressed that permits handling the shape and stacking to multiple height for drying.

6. A pressed and unfired shape of at least one non-plastic refractory material of the group consisting of magnesian refractory, chrome ore, and calcined alumina and containing from about 1 to about 5 per cent each of tall oil and lignin liquor as temporary binder and characterized by possessing green strength as pressed that permits handling the shape and stacking to multiple height for drying.

7. A shape according to claim 5, said refractory being dead burned magnesite.

8. A shape according to claim 5, said refractory being olivine.

COLLIN HYDE.
FRANCIS P. SHONKWILER.

REFERENCES CITED

The following references are of record in the file of this patent:

UNITED STATES PATENTS

| Number | Name | Date |
|---|---|---|
| 712,807 | Karavodine | Nov. 4, 1902 |

FOREIGN PATENTS

| Number | Country | Date |
|---|---|---|
| 196,021 | Great Britain | 1923 |
| 133,898 | Austria | 1933 |
| 472,110 | Great Britain | 1937 |

OTHER REFERENCES

Ser. No. 382,101, Passelecq et al. (A. P. C.), published May 11, 1943.

Chem. and Metallurgical Engineering, Vol. 31, No. 18 (Nov. 3, 1924), pages 696-8.